Patented Sept. 5, 1950

2,521,305

UNITED STATES PATENT OFFICE 2,521,305

PNEUMATIC RUBBER TIRE CONSTRUCTION

Raymond G. Olson, Niles, Ill.

Application April 22, 1947, Serial No. 743,225

2 Claims. (Cl. 152—355)

1

This invention relates to a new and improved pneumatic rubber tire construction.

One of the principal objects of this invention is the provision of means for reinforcing pneumatic tires.

Another important object of this invention is to provide a pneumatic tire capable of quickly dissipating heat.

A further object of this invention is the provision of means for constructing pneumatic vehicle tires in such a manner that they prevent accumulation of static electricity that ordinarily develops in vehicles.

Another and further important object of this invention is to provide the fabric or other flexible plies of a pneumatic tire with deposits of spray metal by a metallizing process such as shown in my copending patent entitled Fabric Reinforcement, Patent No. 2,467,627, for the multiple purpose of reinforcing the tire, making the tire a good dissipater of heat, and rendering it incapable of generating static electricity.

Other and further important objects of this invention will become apparent from the disclosures in the following specification and accompanying drawings.

Figure 1:
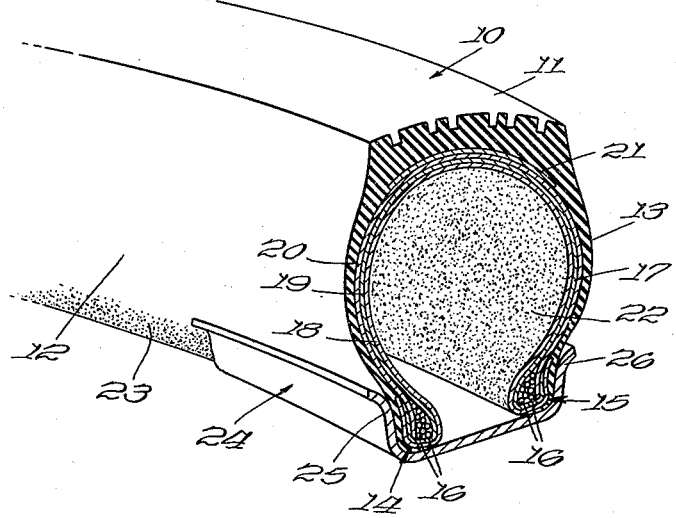
Figure 1 is a perspective view showing the cross section of a pneumatic tire in position on a vehicle rim and incorporating the novel construction of this invention.

The reference numeral 10 indicates generally a pneumatic tire commonly used on vehicles such as automobiles and trucks or the like. The tire 10 includes an annular tread portion 11 of any desired configuration and side walls 12 and 13 terminating in inner annular beads 14 and 15, respectively. The beads are reinforced with steel bands 16. The outer side walls and tread are of a rubber material either natural or synthetic. The rubber superposes a carcass construction of a plurality of plies 17 which may be of any suitable material such as fabric, fibre glass, or synthetic materials. In Figure 1 the innermost ply 18 and the ply 19 adjacent thereto extend down around the steel bands 16 of the beads 14 and 15. The remaining fabric ply 20 projects downwardly on each side into the beads 14 and 15 and thereupon the outer rubber covering forming the side walls and the tread is vulcanized thereto, forming a complete pneumatic tire. An additional

2 fabric ply 21 is shown covering the carcass immediately below the tread portion 11.

Pneumatic tires have been thus constructed for many years. These tires when in use carry great loads and are subjected to extreme weather conditions. The several fabric plies, although closely held together by the vulcanizing of rubber thereto, have limited relative movement, causing friction and thus heat. At times certain portions of the tire become excessively hot whereupon a blow-out of the tire is not unlikely. Pneumatic tires are, of course, equipped with inner tubes (not shown) which are inflated to various amounts of air pressure. Oftentimes the user of a vehicle having pneumatic tires operates the vehicle when the tires are not fully inflated so that friction created between the fabric plies and the fabric and vulcanized rubber in combination is greater than at times when the tires are properly inflated. As a rule excessive heat in a tire is created in some annular stratum of the tire. When the tire is not fully inflated the spreading of the tire in the middle of the side walls causes greatest friction and thus greatest heat around the annular paths of the middle of the side walls. On other occasions when the road is very hot the annular tread becomes hotter than the remainder of the tire.

The purpose of the present invention is to avoid damage to the tire which might be caused by these annular strata of excessive heat in the tire by quickly dissipating and dispersing this heat over the full annular surface of the tire. Dissipating the heat which has built up in these localized annular areas contributes to the long life of the tire. The fabric plies, forming the carcass of this tire, are metallized according to the principles shown in my copending application mentioned above. Metallizing is the spraying of finely divided particles of fused metal under pressure whereupon the metal particles adhere to the constituent threads of the fabric and to each other. The resultant spray metal surface is joined firmly to the fabric and does not materially change the flexibility of the fabric. The metal particles remain in a somewhat globular form and adhere to each other merely at their outer surfaces in what might be called a heterogeneous mass in contradistinction to a homogeneous mass. The fabric plies may be coated on their inner and outer surfaces or, if desired, only portions of the plies need be metallized. In the device as shown in Figure 1, the spray metal surface 22 covers the full inner surface of the innermost fabric ply 18 and extends down around beneath the beads 14 and 15 and up a short distance on the side walls 12 and 13 as shown at 23. A vehicle steel rim 24 is shown confining the tire beads 14 and 15 between spaced side flanges 25 and 26.

Primarily, the metallizing of the fabric plies of a pneumatic tire increases the strength of the tire in that the fabric has its surfaces protected against wear. The metal deposited on the fabric has greater wear resistant qualities than the fabric itself. In certain cases it might be desirable to apply several coatings or deposits of spray metal in order to further enhance the wearing qualities of the tire. The first spray metal deposits are generally of a metal having a relatively low temperature of fusion such as lead or zinc. The reason for employing a metal having a low fusion point as the first coat is to enable the fused metal to envelope and be thrown against the strands of the fabric without injuring the fabric because of high temperatures. In applying a second coat of metal the fabric is fully protected by the first coat and it is possible to employ a metal having a relatively higher temperature of fusion, such as aluminum. Ordinarily, metals having higher temperatures of fusion also are more abrasive resistant and thus any desired surface hardness of metal may be obtained.

In addition to increasing the wearing characteristics of the tire, the metallizing of the fabric plies causes immediate dissipation of tire heat over the full metallized surfaces of the tire and prevents any part of the tire from becoming excessively hot. As mentioned previously, any great heat in the tire causes early decay of the tire and actual deterioration of the fabric plies. Thereupon, by dissipating or distributing the heat over the entire surface of the tire, the resultant life of the tire is materially prolonged.

A further purpose in metallizing the fabric plies of a pneumatic tire is to substantially eliminate the creation of static electricity. Static electricity is generated by the rubbing together or friction of and between two non-conductors of electricity. In the case of present day pneumatic tired vehicles the rubber tires and the pavement are the two electrical non-conductors. The tire acts as a condenser and charges of static electricity continue to generate and build up in the tire until such time as the total charge is capable of discharging to the body of the vehicle or in wet weather to the ground. When the vehicle carries a radio the dissipation of the charge of static electricity from the tire to the vehicle body at the intervals when a sufficient charge is generated causes loud crackling or static noises in the radio. By metallizing the tire casing as described above the rubber tire is converted from a non-conductor to a conductor of electricity and the possibilities of generating static electricity are reduced to a minimum. Should small quantities of static electricity still be generated there would be no arcing of high charges of electricity because the full annular electrical contact between the metallized tire at the surface 23 and the vehicle rim permits continuous discharge of minute electrical charges which are not noticeable in a radio. It is obvious therefore that the metallized tire eliminates the hazards and undesirable effects of static electricity first by preventing its creation and second by providing for its constant dissipation in such a manner as to be not a problem if it is for some unexplained reason generated.

Figure 2:
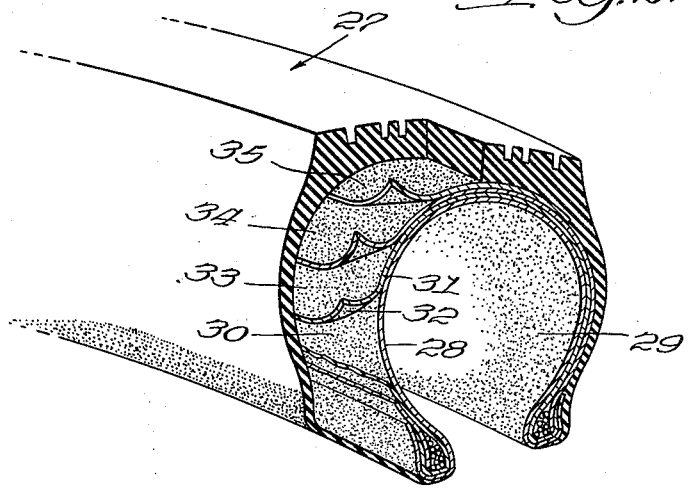
Figure 2 is a view similar to Figure 1, showing a slightly modified tire construction with the several fabric plies exposed.

As best shown in Figure 2, the tire 27 is constructed identically to the tire shown in Figure 1 except for the fact that the fabric plies forming the carcass are metallized on both inner and outer surfaces throughout the entire carcass construction. The inner ply 28 has a spray metal coating 29 on its inner surface and a spray metal coating 30 on its outer surface. Similarly, the adjacent fabric ply 31 is equipped with a spray metal inner surface 32 and a spray metal outer surface 33. The subsequent fabric plies 34 and 35 are also metallized on their inner and outer surfaces. The resultant tire having these numerous metallized surfaces has its strength greatly increased. Similarly, the heat dispersing characteristic as described for the tire shown in Figure 1 is present in its entirety in the tire shown in Figure 2. It is perhaps possible that portions of the fabric plies need not be metalized and still gain beneficial results from partial metallizing. On some occasions it may be desirable to omit the metallizing on the inner surface of the tire.

Many details of construction may be varied throughout a wide range without departing from the principles disclosed herein, and I therefore do not propose limiting the patent granted hereon otherwise than as necessitated by the appended claims.

What is claimed is:

1. A pneumatic tire comprising tread and side wall portions of rubber and a carcass composed of a plurality of overlapping fabric plies, the inner of said plies metallized with a fused metal and enveloping the individual threads of the fabric ply, whereby heat created in the tire is quickly dissipated over the metallized surface.

2. A pneumatic tire for a vehicle having wheels and rims comprising an annular tread and adjacent side walls terminating in inner annular beads, said tread and side walls consisting of a plurality of fabric plies covered with rubber, certain of said fabric plies including the innermost ply having a metallized surface of finely divided particles of spray metal which have been deposited thereon in a fused state so that the particles adhere firmly to and envelop the threads of the fabric plies, and said metallized surface extending around the annular beads to the outer surface of the pneumatic tire.

RAYMOND G. OLSON.

REFERENCES CITED

The following references are of record in the file of this patent:

UNITED STATES PATENTS

| Number | Name | Date |
|---|---|---|
| 1,034,847 | Viel | Aug. 6, 1912 |
| 1,128,059 | Schoop | Feb. 9, 1915 |
| 1,210,375 | Decker | Dec. 26, 1916 |
| 1,945,283 | Loomis | Jan. 30, 1934 |
| 2,357,851 | Scheyer | Sept. 12, 1944 |
| 2,423,995 | Reynolds | July 15, 1947 |